No. 759,219. PATENTED MAY 3, 1904.
E. S. McCAULLEY & T. U. FRANTZ.
MACHINE FOR BINDING CORN SHOCKS.
APPLICATION FILED JAN. 22, 1903. RENEWED FEB. 11, 1904.
NO MODEL.
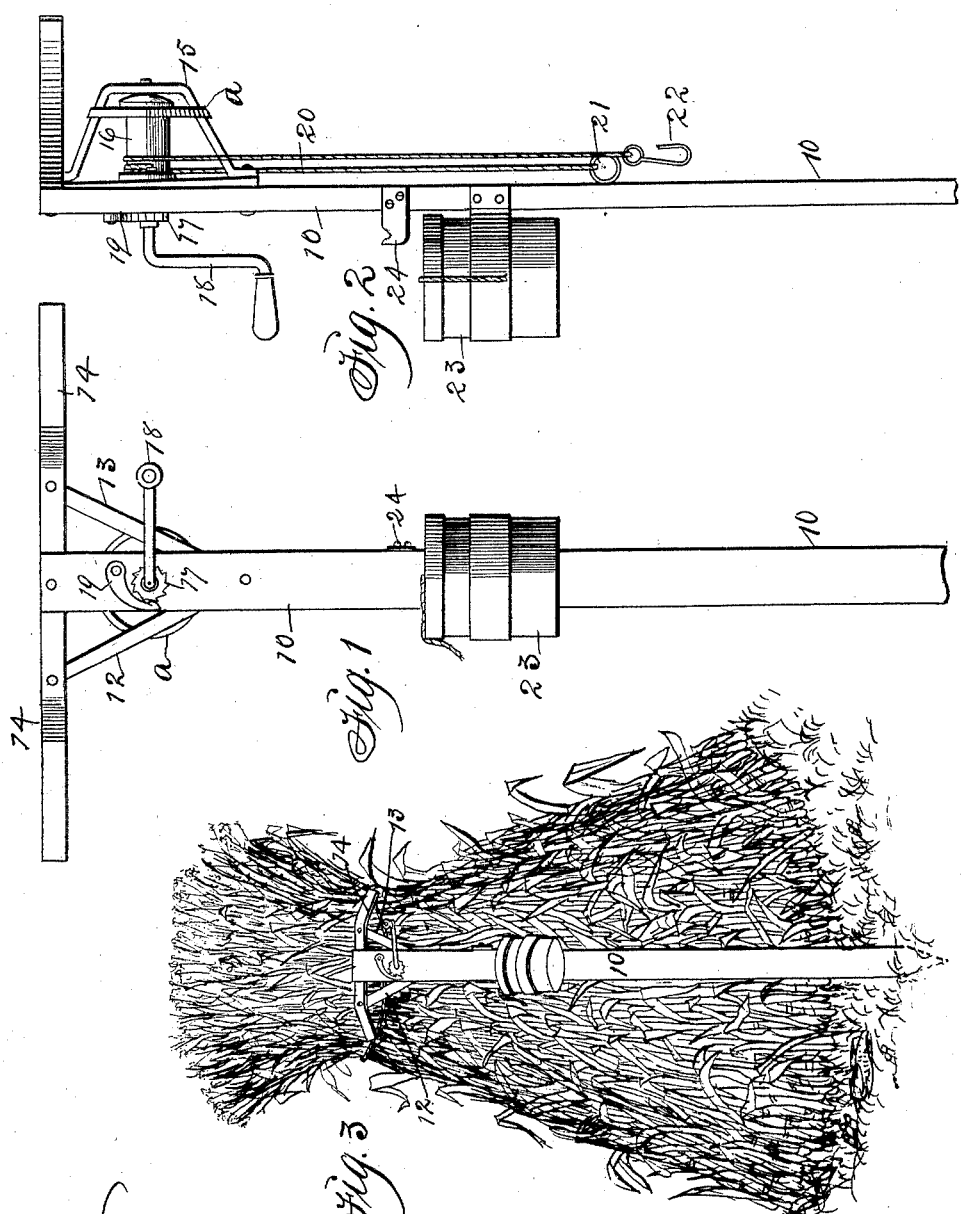

No. 759,219. Patented May 3, 1904.

UNITED STATES PATENT OFFICE.

ELI S. McCAULLEY AND THOMAS U. FRANTZ, OF MONTOUR, IOWA.

MACHINE FOR BINDING CORN-SHOCKS.

SPECIFICATION forming part of Letters Patent No. 759,219, dated May 3, 1904.

Application filed January 22, 1903. Renewed February 11, 1904. Serial No. 193,194. (No model.)

*To all whom it may concern:*

Be it known that we, ELI S. McCAULLEY and THOMAS U. FRANTZ, citizens of the United States, residing at Montour, in the county of Tama and State of Iowa, have invented a new and useful Machine for Binding Corn-Shocks, of which the following is a specification.

Our object is to facilitate the binding of shocks of corn in the field and to save time and labor and prevent annoyances incident to such work on the farm.

Our invention consists in a simple, strong, and durable portable machine adapted to be fastened in the ground aside of a shock of corn or like farm products, as hereinafter set forth, pointed out in our claims, and illustrated in the accompanying drawings, in which—

Figure 1 is a front view, and Fig. 2 a side view, of our invention adapted to be carried by hand from one shock to another. Fig. 3 is a perspective view showing the machine in position at the side of a shock of corn as required in practical use for drawing the top portions of the cornstalks together and holding them compactly to allow a binding-twine to be passed around and tied before the machine is removed.

The numeral 10 designates a straight bar of wood pointed at its lower end and adapted to be pressed into the ground. A frame composed of two straight pieces of wood or metal 12 and 13, fixed to the back of the upper end portion of the bar 10 and inclined laterally in opposite directions, and a curved bar 14, fixed to the tops of the bars 12 and 13, and a metal journal-bearer 15, also fixed to the back of the bar 10 to support the operative mechanism combined therewith.

A windlass 16 is mounted between the bearer 15 and the bar 10 and the end of one of its journals extended through the bar 10 outward for fixing a ratchet-wheel 17 thereto and fixing an arm or crank handle 18 on the same journal and providing it with a pawl 19 for operating the wheel and windlass as required for winding rope 20 upon the roller that is fastened to the roller at the central part of the rope. An eye 21 on one end of the rope and a hook 22 on its other end adapts the end portions of the rope to be drawn around the top portion of a shock of corn, as shown in Fig. 3, and its ends then detachably connected by means of the hook and eye, so that by rotating the roller by means of the handle the rope will be drawn taut and the cornstalks clamped together compactly and held by means of the pawl 19, while a band of twine or other suitable material is placed around the compressed portion of the shock and securely tied by the operator. A fender *a* in the form of a ring fixed to the bearer 15 prevents the rope from getting over the end of the roller. A box 23 for retaining twine is fixed to the front face of the bar 10 and provided with an aperture in its cover to allow the twine to be drawn out of the box, as desired. A cutter 24 is fixed to the edge of the bar 10 above the box 23, as shown, or in any suitable position so the lengths of twine required can be cut off after being placed around the shocks. When a shock is thus bound, the tension of the rope drawn around its top portion can be readily relaxed by releasing the pawl from the ratchet-wheel and rotating the windlass in a reverse way and the hook then removed from the eye and the rope and machine removed and taken to another shock, as required to bind shocks successively.

Having thus described the purpose of our invention, its construction, application, and operation, the practical utility thereof will be obvious to persons familiar with the art to which it pertains.

What we claim as new, and desire to secure by Letters Patent, is—

1. A machine for tying shocks of corn comprising a frame consisting of a straight bar pointed at its lower end, short bars fixed to the top end portions of said bar to extend horizontally in opposite directions from said straight bar, a journal-bearer fixed to the back and top portion of the straight and pointed bar, a windlass mounted between the journal-bearer and said straight bar and means for operating the windlass, a rope having a hook at one end and an eye at its other end and the central part of the rope fixed to the windlass arranged and combined to operate in the manner set forth for the purposes stated.

2. A machine for tying shocks of corn comprising a frame consisting of a straight bar pointed at its lower end, short bars fixed to the top end portion of said straight bar to extend horizontally in opposite direction from said straight bar, a windlass, means for operating the windlass, means for locking the windlass, a rope having a hook at one end and an eye at its other end and the central part of the rope fixed to the windlass, arranged and combined to operate in the manner set forth.

ELI S. McCAULLEY.
THOS. U. FRANTZ.

Witnesses:
W. C. YOUNG,
F. B. MILLARD.